US011307744B2

(12) United States Patent
Suontama

(10) Patent No.: US 11,307,744 B2
(45) Date of Patent: Apr. 19, 2022

(54) BILLBOARD AND METHOD OF RETROFITTING A BILLBOARD FOR A VIDEO CONTENT REPLACEMENT SYSTEM

(71) Applicant: Supponor OY, Espoo (FI)

(72) Inventor: Vesa Suontama, Espoo (FI)

(73) Assignee: Supponor OY, Espoo (FI)

( * ) Notice: Subject to any disclaimer, the term of this patent is extended or adjusted under 35 U.S.C. 154(b) by 9 days.

(21) Appl. No.: 16/912,247

(22) Filed: Jun. 25, 2020

(65) Prior Publication Data

US 2021/0409638 A1 Dec. 30, 2021

(51) Int. Cl.
*G06F 3/0484* (2013.01)
*G06F 3/04842* (2022.01)
*H04N 5/645* (2006.01)
*H04N 21/234* (2011.01)
*H04N 21/2668* (2011.01)
*H04N 21/414* (2011.01)
*F21V 8/00* (2006.01)
*G09F 9/00* (2006.01)
*G09F 15/00* (2006.01)
*G09F 19/12* (2006.01)

(52) U.S. Cl.
CPC ......... *G06F 3/04842* (2013.01); *G02B 6/009* (2013.01); *G02B 6/0043* (2013.01); *G02B 6/0055* (2013.01); *G02B 6/0061* (2013.01); *G02B 6/0065* (2013.01); *G02B 6/0066* (2013.01); *G02B 6/0093* (2013.01); *G09F 9/00* (2013.01); *G09F 15/0012* (2013.01); *G09F 19/12* (2013.01); *H04N 5/645* (2013.01); *H04N 21/23424* (2013.01); *H04N 21/2668* (2013.01); *H04N 21/41415* (2013.01)

(58) Field of Classification Search
CPC .................. G06F 3/04842; G09F 13/0445
See application file for complete search history.

(56) References Cited

U.S. PATENT DOCUMENTS

| | | | | |
|---|---|---|---|---|
| 5,940,139 A | * | 8/1999 | Smoot | H04N 5/272 348/584 |
| 10,033,959 B2 | * | 7/2018 | Rantalainen | H04N 5/272 |
| 2002/0186956 A1 | * | 12/2002 | Lowry | G09F 9/305 385/147 |
| 2017/0324889 A1 | * | 11/2017 | Nevatie | H04N 5/2723 |
| 2019/0227419 A1 | * | 7/2019 | Mcnelley | G03B 21/2033 |

\* cited by examiner

*Primary Examiner* — Keith G. Delahoussaye
(74) *Attorney, Agent, or Firm* — Coats + Bennett, PLLC

(57) ABSTRACT

A billboard which is formed as a dasher board (600) and adapted for use in a video content replacement system (400) is described. The dasher board (600) comprises at least one non-visible radiation source (604) arranged to emit non-visible radiation toward a light guide plate (602). The light guide plate (602) is arranged to distribute the non-visible radiation over the light guide plate (602) and radiate the non-visible radiation away from the dasher board (600). An area of the light guide plate (602) over which non-visible light is distributed from is correlated to an area of the dasher board (600) which is to be replaced in the video content replacement system (400). There is also described a billboard (700) similarly adapted for use in a video content replacement system (400) and which comprises an electronic display, as well as a method of retrofitting an existing billboard (10) ready for use in a video content replacement system (400).

14 Claims, 6 Drawing Sheets

_US 11,307,744 B2_

BILLBOARD AND METHOD OF RETROFITTING A BILLBOARD FOR A VIDEO CONTENT REPLACEMENT SYSTEM

BACKGROUND

The present description relates generally to a system for billboards which are adapted for use in a video image content replacement, in which an apparatus detects a target area in one or more regions of a video image stream, and which may replace the target area with alternate content. In some examples, a dynamic image content replacement system is described that is suitable for use with live television broadcasts.

In the related art, one or more target areas within a video image signal are defined and then replaced with alternate images appropriate to specific viewer groups or geographical regions. For example, billboards at a ground or arena of a major sporting event are observed as part of a live broadcast, and these target areas are electronically substituted by alternate images that are more appropriate for a particular country or region. In particular, such a system is useful to create multiple video feeds each having different electronically generated advertisement content which is tailored according to an intended audience. For example, a billboard in the original images is seen live by the stadium audience with 'advert 1' and likewise for a home broadcast feed. However, the billboard is electronically modified to carry 'advert 2' for 'country 2', while 'advert 3' is added for 'region 3', and so on. This situation is particularly relevant for an event of worldwide interest which is to be broadcast to a large number of countries or regions and where it is desired to dynamically modify the video images appropriate to, for example, each specific audience, geo location, demographic, behavioural psychographic, platform, device type, and/or generally any other type of audience segmentation.

A difficulty arises with how to define the target area within the video image signal that is to be replaced: a billboard will often be at least partly obscured by players and objects in front of said billboard which are often in irregular shapes and forms and moving rapidly. Another difficulty arises in that billboards, particularly pitchside billboards, are positioned close to the action of the respective sport and are therefore at high risk of receiving impacts and the like which may affect performance of the system.

Considering the related art, it desirable to provide a robust billboard which may be reliably and effectively identified by a video content replacement system. Further, there is an ongoing desire to improve the flexibility for configuring the system, so that the system may be installed and commissioned more readily alongside other existing infrastructure and equipment, which may well be owned or operate by different parties.

It is now desired to provide an apparatus and method which will address these, or other, limitations of the current art. As will appreciated from the discussion herein, at least some of the example embodiments allow billboards to be identified more readily and more accurately in a video content replacement system. Further, in some examples, many of the other difficulties of the previous approaches are also alleviated.

SUMMARY

The present invention is defined according to the independent claims. Additional features will be appreciated from the dependent claims and the description herein. Any embodiments which are described but which do not fall within the scope of the claims are to be interpreted merely as examples useful for a better understanding of the invention.

In one example there is described a billboard which is formed as a modified dasher board adapted for use in a video content replacement system. The dasher board comprises at least one non-visible radiation source arranged to emit non-visible radiation toward a light guide plate. The light guide plate is arranged to receive the non-visible radiation on at least one edge of the light guide plate, distribute the non-visible radiation over the light guide plate, and radiate the non-visible radiation away from the dasher board. Here an area of the light guide plate over which non-visible light is distributed is correlated to an area of the dasher board which is to be replaced in the video content replacement system. Suitably the light guide plate may serve as at least part of an alternative front panel for the dasher board. Further optional components include a reflector plate and an infra-red transparent shield panel.

In another example there is described a billboard adapted for use in a video content replacement system which includes an electronic display which displays visible content (e.g. advertising). In this example the billboard comprises at least one non-visible radiation source arranged to emit non-visible radiation toward a light guide plate mounted in front of the electronic display. The light guide plate is arranged to receive the non-visible radiation on at least one edge of the light guide plate, distribute the non-visible radiation over the light guide plate, and transmit the non-visible radiation away from the billboard. Here an area of the light guide plate over which non-visible light is distributed is coincident with a display area of the electronic display which displays the visible content. In this way the visible content may be easily identified and replaced with alternative content in the video content replacement system.

In another example there is described a billboard which has been modified for use with a video content replacement system. The billboard comprises a non-visible radiation source and a light guide plate. The non-visible radiation source emits radiation, such as infra-red or near infra-red 'NIR', toward an edge of the light guide plate which in turn distributes the non-visible radiation over itself and transmits the non-visible radiation away from the billboard. The area of the light guide plate which non-visible light is distributed over (and thereby transmitted from) correlates to a display area of the billboard which is to be replaced in the video content replacement system. Thus, when a non-visible light image of the billboard is provided to the content replacement system, the content replacement system may more readily identify a display area of the billboard based on a luminosity of the light guide plate in the infra-red image.

In one example there is described a method of retrofitting a billboard ready for use in a video content replacement system, comprising providing the billboard with a non-visible radiation source and a light guide plate for diffusing radiation of a wavelength emitted by the non-visible radiation source. The light guide plate is provided so as to receive the non-visible radiation along one of its edges, distribute the non-visible radiation over itself, and transmit the non-visible radiation away from the billboard. Suitably an area of the light guide plate over which non-visible light is distributed is correlated to a display area of the billboard which is to be replaced in the video content replacement system.

In another example there is described a method for replacing video content in a broadcast feed, the method comprising emitting non-visible radiation toward a light guide plate of a billboard, distributing the non-visible radiation over the light guide plate and emitting non-visible radiation from the light guide plate, capturing an image of the emitted non-visible radiation, analysing the captured image to identify a target area based on an area of the image with the light guide plate, applying a digital mask to an area of a broadcast feed which correlates to the target area, and applying alternative content to the digital mask area of the broadcast feed.

BRIEF DESCRIPTION OF THE DRAWINGS

For a better understanding of the invention, and to show how embodiments of the same may be carried into effect, reference will now be made, by way of example, to the accompanying drawings in which.

DETAILED DESCRIPTION

The example embodiments will be described with reference to a video content replacement system (VCRS), or more generally an apparatus and method for image content manipulation. For example, the VCRS system may be used to replace content within television video images and particularly to provide photo-realistic replacement of a billboard for live television broadcasts, as might be found pitch/court side at a sporting event. However, the methods and apparatus may be applied in many other specific implementations, which may involve other forms of video images or relate to other subjects of interest, as will be apparent to persons skilled in the art from the teachings herein.

In one example, a more pleasing and photo-realistic result can be achieved in the output images. Advantageously the ordinary viewer now does not notice that a content substitution is performed. In particular, the content substitution process performed by the system does not detract from the viewer's enjoyment of the eventual images. The system thus maintains value in the images for the broadcaster and for interested parties (e.g. advertisers or sponsors) whose content has been manipulated by the system.

Video Content Replacement System

Figure 1:
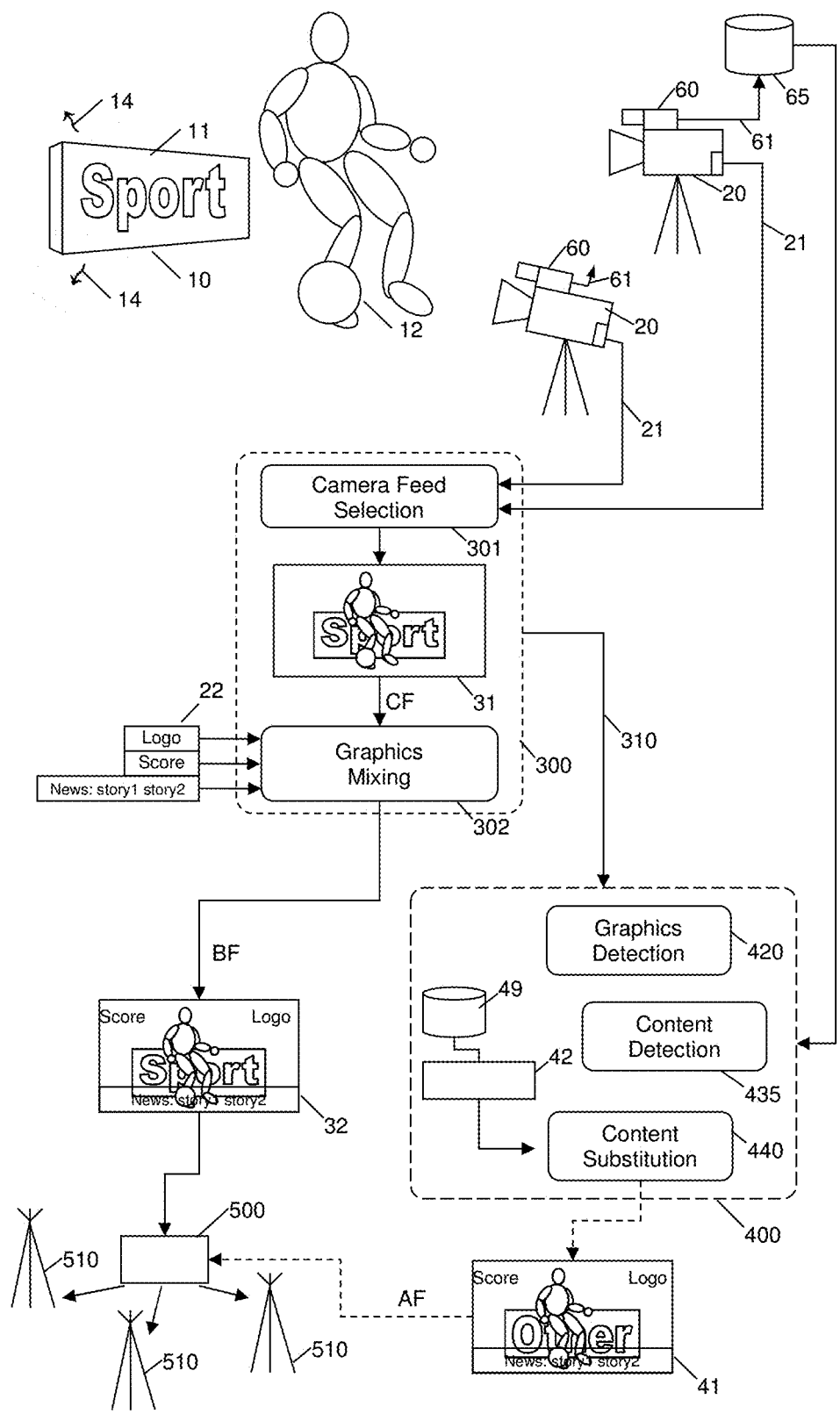
FIG. 1 is a schematic is a schematic overview of a video content broadcasting system.

FIG. 1 is a schematic overview of a video content replacement system in which example embodiments may be applied. This example includes one or more cameras 20 used to observe one or more subjects, which in this example include a set of billboards 10, a vision mixing system 300, a content replacement system 400, and a broadcast delivery system 500. It will be appreciated that this video or television broadcasting system has been simplified for ease of explanation and that many other specific configurations will be available to persons skilled in the art.

In the example embodiments, a billboard may be included in a broadcast image when a sporting event, such as a football or soccer match, is shown live to a large audience. The audience may be geographically diverse, e.g., worldwide, and hence it is desirable to create multiple different alternate broadcast feeds AF for supply to the broadcasting system 500 to be delivered in different territories using local delivery broadcast stations 510, e.g. country by country or region by region. In a live event, the content replacement system 400 should operate reliably and efficiently, and should cause minimal delay (e.g. only by a few frames).

In this example, the content replacement system 400 is coupled to receive the incoming video images from the vision mixing system 300, i.e. using the set of monitoring cables 310, and to supply the amended video images as an alternate feed AF 41 to the broadcast system 500. A graphics detection unit 420 may be provided within the content replacement system 400, which detects the presence of graphics layers in the incoming video feed and then helps to preserve those graphics layers when producing the alternate feed AF 41. Operation of the vision mixing system 300 and content replacement system 400 are explored in further detail in U.S. Pat. No. 9,948,834 B2, the content of which is incorporated herein by reference.

In one example, the content replacement system 400 may be provided as a separate and stand-alone piece of equipment, which is suitably connected by appropriate wired or wireless communications channels to the other components of the system as discussed herein. In this case, the content replacement system 400 may be provided in the immediate vicinity of the vision mixing system 300, or may be located remotely. As a further example, the content replacement system 400 might be embodied as one or more software modules which execute using hardware of the vision mixing system 300 or by using hardware associated therewith. The content replacement system 400 may receive video images directly from the vision mixing system 300, or via one or more intermediate pieces of equipment. The input video images may be recorded and then processed by the content replacement system 400 later, and/or the output images may be recorded and provided to other equipment later.

In the illustrated embodiment, the subject of interest is a billboard 10 which carries original content 11 such as an advertisement (in this case the word "Sport"). The billboard 10 and the original content 11 are provided to be seen by persons in the vicinity. For example, many billboards are provided at a sporting stadium or arena visible to spectators present at the event. In one example, the billboards 10 are provided around a perimeter of a pitch so as to be prominent to spectators in the ground and also in video coverage of the event.

One or more television cameras 20 each observe a scene in a desired field of view to provide a respective camera feed 21. The field of view may change over time in order to track a scene of interest. The camera 20 may have a fixed location or may be movable (e.g. on a trackway) or may be mobile (e.g. a hand-held camera or gyroscopic stabilised camera). The camera 20 may have a fixed lens or zoom lens, and may have local pan and/or tilt motion. Typically, many different cameras 20 are provided to cover the event or scene from different viewpoints, producing a corresponding plurality of camera feeds 21.

The billboard 10 may become obscured in the field of view of the camera 20 by an intervening object 12, such as by a ball, person or player. Thus, the camera feed 21 obtained by the camera 20 will encounter different conditions at different times during a particular event. As examples, these conditions may include any of (a) the subject billboard 10 moving into or out of the field of view, (b) the field of view showing only a part or portion of the subject billboard 10, (c) the subject billboard 10 being obscured, wholly or partially, by an object 12, and/or (d) the subject billboard 10 being both partially observed and partially obscured. Hence, there is a difficulty in accurately determining the position of the desired subject billboard 10 within the relevant video images, and defining a masking area or target area where the content within the video images is to be enhanced or modified, such as by being electronically replaced with alternate image content.

In this example, the captured camera feeds 21 are provided, whether directly or indirectly via other equipment, to the vision mixing system 300. Here, the vision mixing system 300 may include a camera feed selector function 301 and a graphics overlay mixer function 302. Amongst other functions, the vision mixing system 300 may be used to select amongst the camera feeds 21 at each point in time to produce a clean feed (CF) 31, also known as a director's cut clean feed. The vision mixing system 300 is typically operated by a skilled vision engineer, who responds to instructions from a director of this transmission. The vision mixing system 300 may incorporate or be coupled to a graphics generator which provides a plurality of graphics layers 22 such as a station logo ("Logo"), a current score ("Score") and a pop-up or scrolling information bar ("News: story1 story2"). Typically, the one or more graphics layers 22 are applied over the clean feed 31 to produce a respective dirty feed or broadcast feed (BF) 32. A separate graphics computer system may produce one or more of the graphics layers 22, and/or the graphics layers 22 may be produced by components within the vision mixing system 300 itself. The graphics layers 22 may be semi-transparent and hence may overlap the observed billboard 10 in the video images. The graphics layers 22 may be dynamic, such as a moving logo, updating time or score information, or a moving information bar.

A broadcast feed BF 32 is output to be transmitted as a broadcast feed, e.g. using a downstream broadcast delivery system 500. The feed may be broadcast live and/or is recorded for transmission later. The broadcast feed BF may be subject to one or more further image processing stages, or further mixing stages, in order to generate the relevant eventual feed as seen by viewers, as will be familiar to those skilled in the art. The broadcast delivery system 500 may distribute and deliver the broadcast feed in any suitable form including, for example, terrestrial, cable, satellite or Internet delivery mechanisms to any suitable media playback device including, for example, televisions, computers or hand-held devices. The broadcast feed may be broadcast to multiple viewers simultaneously, or may be transmitted to users individually, e.g. as video on demand.

The content replacement system 400 is arranged to identify relevant portions of video images corresponding to the observed subject of interest. That is, the content replacement system 400 suitably performs a content detection function 435 to identify target areas or regions within the relevant video images which correspond to the subject of interest. The content replacement system 400 may also perform a content substitution function 440 to selectively replace the identified portions with alternate content, to produce an alternate feed AF 41 which may then be broadcast as desired. In another example, the content substitution function may be performed later by a separate content substitution unit (also called a 'remote adder' or 'local inserter'). In which case, an intermediate feed may be carried by the system, e.g. as an auxiliary signal stream, from one part to the other over suitable communications networks such as a satellite link or the Internet.

In more detail, the content replacement system 400 receives suitable video image feeds, and identifies therein a target area relevant to the subject of interest (i.e. the billboard 10). The received images may then be modified so that the subject of interest is replaced with alternate content 42, to produce amended output images 41. In this illustrative example, a billboard 10, which originally displayed the word "Sport", now appears to display instead the alternate content 42, as illustrated by the word "Other".

In the example embodiments, the alternate content 42 comprises one or more still images (e.g. JPEG image files) and/or one or more moving images (e.g. MPEG motion picture files). As another example, the alternate content 42 may comprise three-dimensional objects in a 3D interchange format, such as COLLADA, Wavefront .OBJ or Autodesk®.3DS file formats, as will be familiar to those skilled in the art. The alternate content 42 is suitably prepared in advance and is recorded on a storage medium 49 coupled to the content replacement system 400. Thus, the content replacement system 400 produces one or more alternate feeds AF where the observed subject 10, in this case the billboard 10, is replaced instead with the alternate content 42. Ideally, the images within the alternate feed AF 41 should appear photo-realistic, in that the ordinary viewer normally would not notice that the subject 10 has been electronically modified. Hence, it is important to accurately determine a masking area defining the position of the billboard 10 within the video images input to the content replacement system 400. Also, it is important to identify accurately when portions of the observed subject 10 have been obscured by an intervening object 12 such as a player, referee, etc. Notably, the intervening object or objects may be fast-moving and may appear at different distances between the camera 20 and the subject 10. Further, it is desirable to produce the alternate feed 41 containing the alternate content 42 in a way which is more agreeable for the viewer, and which is less noticeable or obtrusive. Thus, latency and synchronisation need to be considered, as well as accuracy of image content manipulation.

The example content replacement system 400 is arranged to process a plurality of detector signals 61. In one example embodiment, the detector signals 61 may be derived from the video images captured by the camera 20, e.g. using visible or near-visible light radiation capable of being captured optically through the camera 20, wherein the camera 20 acts as a detector 60. In another example embodiment, one or more detectors 60 are provided separate to the cameras 20.

The detector signals 61 may be derived from any suitable wavelength radiation. In particular, the wavelengths may be non-visible so as to be undetectable to spectators. In the following example embodiment, the detector signals 61 are derived from near infra-red wavelengths, and the detector signals 61 are infra-red video signals representing an infra-red scene image. Another example embodiment may detect ultra-violet radiation. In one example embodiment, polarised non-visible radiation may be detected. A combination of different wavelength groups may be used, such as a first detector signal derived from any one of infra-red or ultra-violet wavelengths and a second detector signal derived from any one of infra-red or ultra-violet wavelengths.

In the illustrated example embodiment, one or more detectors 60 are associated with the camera 20. In the example embodiment, each camera 20 is co-located with at least one detector 60. The or each detector 60 may suitably survey a field of view which is at least partially consistent with the field of view of the camera 20 and so include the observed subject of interest (e.g., billboard 10). The detector field of view and the camera field of view may be correlated. Thus, the detector signals 61 are suitably correlated with the respective camera feed 21. In the example embodiment, the detector signals 61 are fed to the content replacement system 400. In the example embodiment, the detector signals 61 are relayed live to the content replacement system 400. In another example embodiment, the detector signals 61 may be recorded into a detector signal storage medium 65 to be replayed at the content replacement system 400 at a later time.

As an example, the one or more detectors 60 may be narrow-spectrum near infra-red (NIR) cameras. The detector 60 may be mounted adjacent to the camera 20 so as to have a field of view consistent with the camera 20. Further, in some embodiments, the detectors 60 may optionally share one or more optical components with the camera 20.

The detector 60 may be arranged to move with the camera 20, e.g. to follow the same pan & tilt motions. In the example embodiments, the cameras 20 may provide a telemetry signal which records relevant parameters of the camera, such as the focal length, aperture, motion and position. In one example, the telemetry signal includes pan and tilt information. The telemetry may also include zoom information or zoom information may be derived from analysing the moving images themselves. The telemetry may be used, directly or indirectly, to calculate or otherwise provide pan, roll, tilt and zoom (PRTZ) information or other form of camera parameters such as a 3×4 camera matrix. The camera telemetry signal may be passed to the content replacement system 400, whether directly or via an intermediate storage device, in order to provide additional information about the field of view being observed by each camera 20.

Modified Billboards

Generally, the present system relates to billboards which may be positioned at a side of a pitch, i.e. a pitchside billboard, in order to be readily visible by spectators and cameras alike.

Suitably the billboard 10 may be provided with one or more light emitters (sources) which emit non-visible radiation 14 at a wavelength detectable by the one or more detectors 60. For example, when the detectors 60 are NIR cameras, the billboard may be arranged to emit NIR light so as to identify the billboard 10 to the content replacement system 400. As such, in this example, the detector signals 61 relayed to the content replacement system 400 include NIR images captured by an NIR detectors 60 which are correlated to each camera 20.

Preferably the example billboard 10 is arranged to emit NIR light across an area of the billboard 10 which is coincident with a display area of the billboard onto which the original content 11 is displayed. That is, the NIR light may define the masking (or target) area which is to be replaced by the video content replacement system 400. In this way the raw detector signal data may be efficiently used to define the target area.

Figure 2:
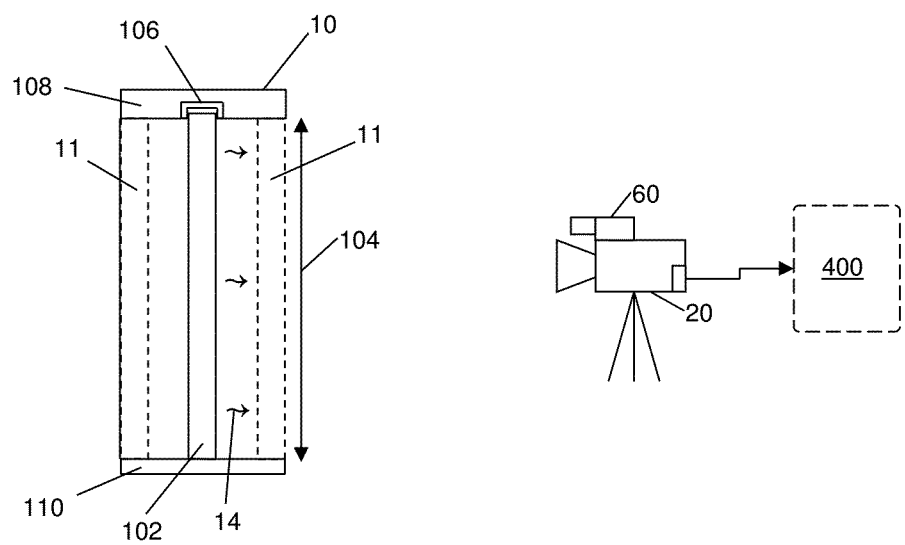
FIG. 2 is a schematic diagram of a billboard configured for use with a content replacement system.
Figure 3:
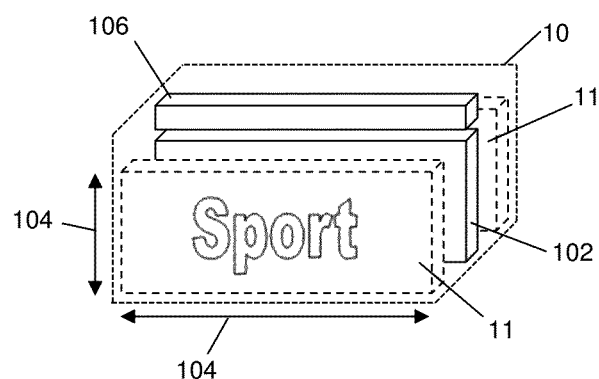
FIG. 3 is another schematic diagram of a billboard configured for use with a content replacement system.

FIGS. 2 (side) & 3 (perspective) show a schematic overview of a billboard 10 configured to operate on this principle. Suitably the billboard 10 may include at least one non-visible radiation source 106 (e.g. NIR source) arranged to emit non-visible radiation and a light guide plate 102 arranged to receive the non-visible radiation along at least one of its edges. The light guide plate 102 may be configured to distribute the non-visible radiation over the light guide plate 102 and transmit the non-visible radiation away from the billboard 10 in a direction which is visible to the video content replacement system. More specifically the non-visible radiation transmitted by the light guide plate 102 may be received by one or more detectors 60. Suitably an area 104 of the light guide plate 102 over which the non-visible light is distributed (and thereby transmitted from) is correlated with an area of the billboard which is to be replaced in the video content replacement system.

In this example the light guide plate 102 is coterminous with a top section 108 and bottom section 110 of the billboard, thereby defining a full height of the billboard between these sections as the display area 104. It will however be appreciated that other configurations are possible depending on the size and shape of the display area 104 to be replaced in the video content replacement system 400.

Original content 11 may be provided on the billboard 10 either in front of or behind the light guide plate 102 (relative to the camera 20); the further design considerations which result from each specific arrangement of the content 11 is explored in more detail below.

Ice Rink Dasher Board

Figure 4:
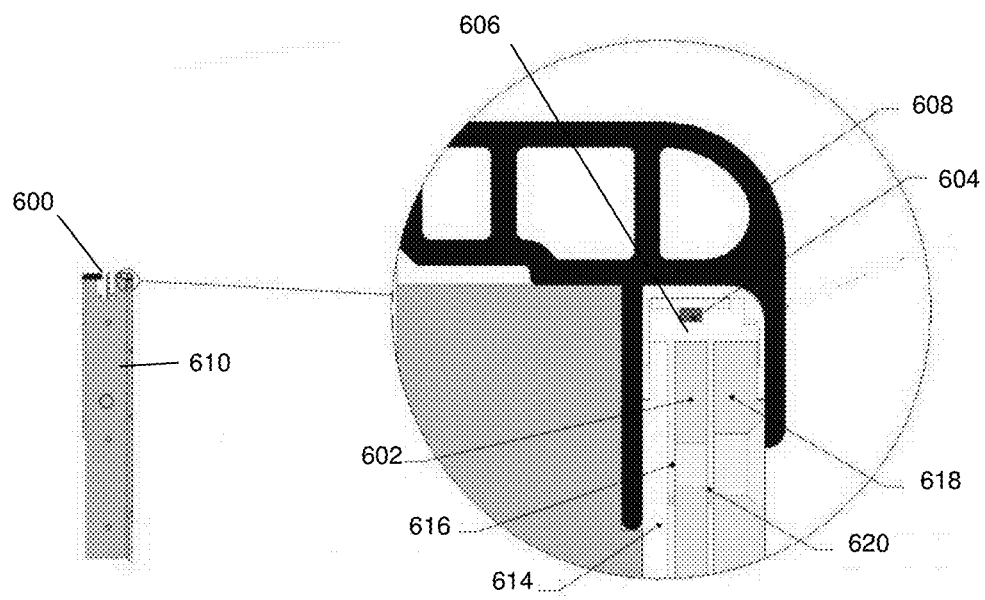
FIG. 4 shows a side view of a dasher board for use in a content replacement system.
Figure 5:
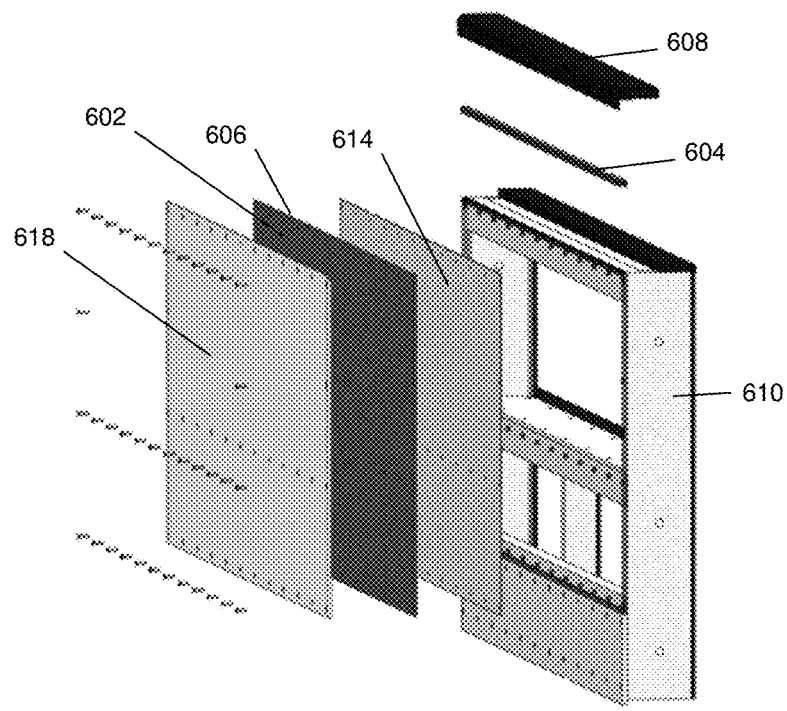
FIG. 5 shows an expanded view of a dasher board for use in a content replacement system.

FIGS. 4 & 5 show a first example embodiment whereby the billboard is realised as a dasher board 600 for an ice rink; in particular the present embodiment is envisaged as a dasher board particularly suited for use during a game of ice hockey. FIG. 4 shows a side view of the dasher board 600 (i.e. horizontally along its thin edge) while FIG. 5 shows an expanded view of the construction of the dasher board 600.

As will be familiar to those in the art, a dasher board serves to segregate an ice rink from surrounding areas such as seating. Standard dasher boards include: a frame; a front panel—often termed a shield plate—attached to the frame on an iceward side of the dasher board, and to which content 11 (e.g., advertising content) may be attached (e.g. a poster) or painted; a rear panel on the opposite side of the frame away from the ice; means for mounting a transparent window on top of the frame in between the front and rear panels (such that the transparent window extends vertically above the dasher board); and means for engaging the dasher board with neighbouring dasher boards. Many dasher boards also include hand rests/rails either side of the transparent window mounting.

To adapt a dasher board for use in a content replacement system 400, the dasher board 600 of the present disclosure replaces the usual front panel with an optical structure capable of emitting NIR light which may be received by an NIR detector 60 for future processing by a content replacement system 400. Thus, advantageously, the dasher board of the present disclosure may be suitably implemented as a retrofit for existing dasher boards, thereby keeping upgrade costs low.

Suitably the modified dasher board 600 of the present disclosure comprises an NIR emitter 604 arranged to provide NIR light to a light guide plate 602. In other words, the optical structure which replaces the normal front panel of a dasher board comprises at least a light guide plate 602 and an NIR emitter 604.

As already described above, the light guide plate 602 diffuses the NIR light across the surface area of the light guide plate 602. Emission of the NIR light from the surface of the light guide plate 602 allows the light guide plate 602 to act as a broad light source. Thus, the light guide plate 602 (when illuminated) may be readily detected by an NIR detector 60 with the light guide plate 602 appearing as a locally bright area on an NIR image captured by that detector 60. When the NIR image is provided to the content replacement system 400, the content replacement system 400 may treat the locally bright area of the light guide plate 602 (i.e. an area of high NIR output) as a target area for content replacement.

Suitably the NIR emitter 604 may take the form of a strip of NIR light emitting diodes 'LEDs', such as Osram NIR type LEDs, arranged to illuminate a thin edge of the light guide plate 602, preferably a top edge 606. Preferably the dasher board is arranged to house the NIR emitter 604 in a handrail portion 608 of the dasher board. More specifically, a modified handrail 608 comprising the NIR emitter may be provided as a replacement for an existing handrail of a dasher board. In this way a dasher board may be modified to include the NIR emitter 604 without alterations to the original frame 610. Suitably the NIR emitter 604 is hidden from direct view by a detector 60 and is also protected from damage by the sturdy and robust handrail construction.

It will be appreciated that a power source is required in order to power the NIR emitter 604, and any suitable power source known in the art may be used to power the NIR emitter 604. In a preferred embodiment a power supply unit is installed and housed within the original frame 610 which further allows for electrical wiring to power the NIR emitter to also be hidden within the frame 610. Suitably each dasher board 600 which forms a segment of an ice rink boundary may be provided with its own power supply unit, or the power supply may be shared between adjacent dasher boards. As the NIR emitter 604 will be in use for an extended period during e.g. an ice hockey game, it is preferable that the NIR emitter 604 consumes only a low voltage, and accordingly the power supply unit need only supply a low voltage, thereby minimising energy consumption. By way of example, the power consumption of the NIR LEDs may be between 23 and 56 Watts, and the power supply unit may output 60 Watts.

Suitably the light guide plate 602 may be formed from polycarbonate. Polycarbonate possesses suitable resilience for use in ice rink applications whereby impacts from people and pucks—weighing around 170 grams (6 ounces) and travelling at around 160 kilometers per hour (100 miles per hour) when struck—may be common. This represents a departure from known light guide plates, which are typically acrylic, but were found by the applicant to be too fragile for practical use in a dasher board.

One downside to using polycarbonate is that NIR light transmission is not as efficient as the known acrylic. To combat this reduction in NIR scattering, the light guide plate 602 may comprise NIR boosting zones 612. That is, the light guide plate 602 may comprise zones which increase scattering of NIR light, thereby improving uniformity of NIR transmission from the surface of the light guide plate 602.

Figure 6:
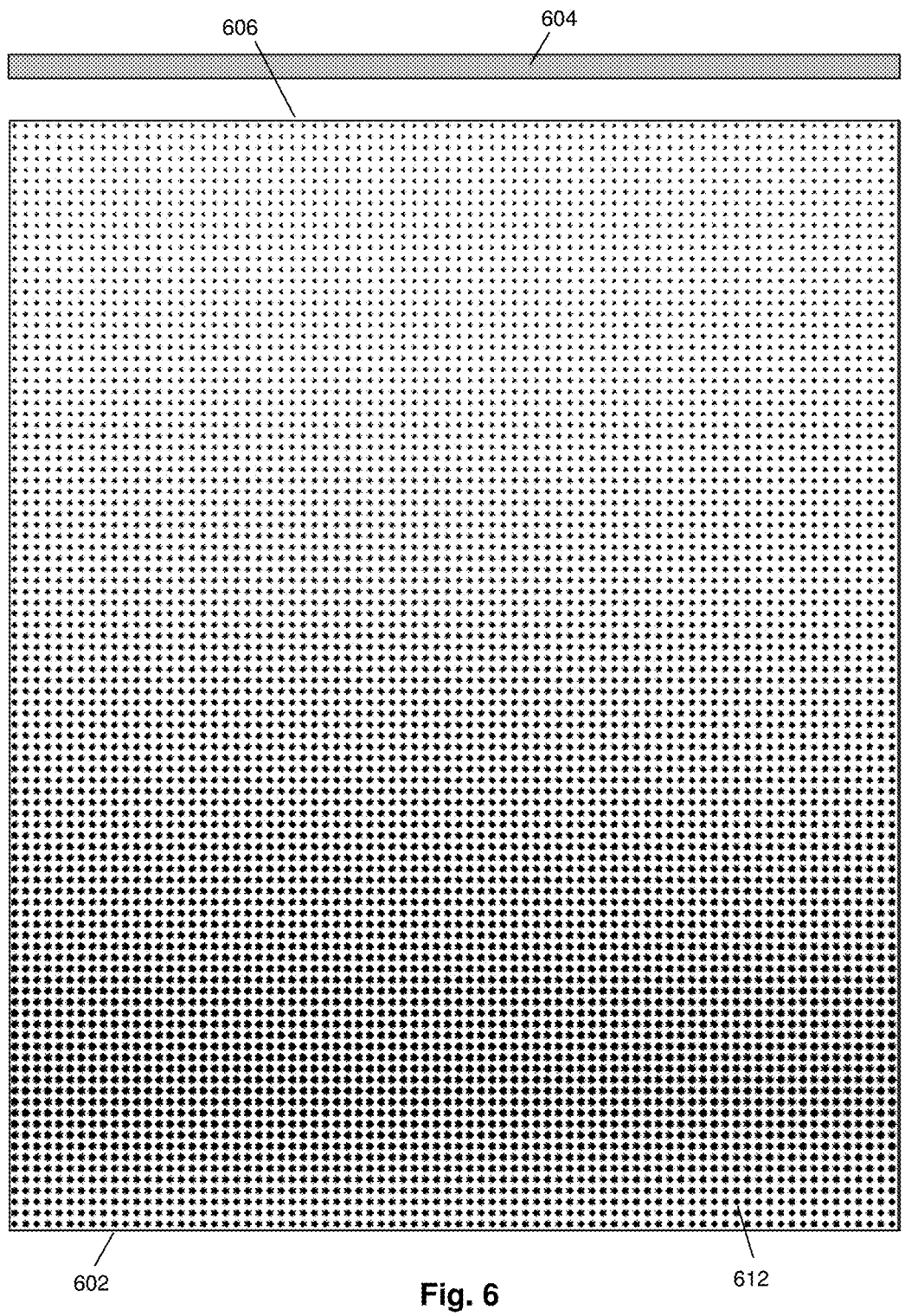
FIG. 6 shows a simplified view of a light guide plate for use with a dasher board.

FIG. 6 shows one example whereby the NIR boosting zones 612 take the form of white dots (black in the Figure) printed on the surface of the light guide plate 602 which faces iceward. To improve scattering efficiency in regions of the light guide plate 602 furthest away from the NIR emitter 604, a diameter of a dot increases in size the further from the NIR emitter said dot is on the light guide plate. Thus, in the example shown, dots at the top of the light guide plate 602 have smaller diameters than dots at the bottom of the light guide plate 602. There is no variance in dot diameter left to right in the figure, i.e. parallel to the NIR emitter 604, as in this example the NIR emitter 604 is provided as a strip which generally illuminates the top edge 606 of the light guide plate 602.

To further improve illumination efficiency of the light guide plate 602 the dasher board 600 may further include a reflector plate 614, as demonstrated in FIGS. 4 & 5. Suitably the reflector plate 608 is formed from aluminium and has a reflective surface which faces a rear of the light guide plate 602. Suitably the reflector plate 614 may be provided between the frame 610 and the light guide plate 602, and may be arranged to have substantially the same profile as the light guide plate 602. One or more washers 616 may be provided between the light guide plate 602 and reflector plate 614 so that an air gap may be provided between the light guide plate 602 and reflector plate 614. In this way any impacts received by the light guide plate 602 are less likely to be transmitted to the reflector plate 614, thereby improving longevity of the reflector plate 614 and billboard as a whole. In addition, the airgap between the plate helps maintain the uniformity of the light diffused by the light guide plate 602. Contact with other plates may act as a light coupler and create hotspot areas of increased radiation emission. In other words, it is beneficial to isolate the light guide plate 602 substantially across its whole area.

Suitably the dasher board 600 may further comprise a protective shield panel 618 covering the light guide plate 602. That is, the protective shield panel 618 may be arranged in front on the light guide plate 602 on the iceward side of the dasher board. The protective shield panel 618 may be formed from a material which is suitably transparent to NIR light so as to allow transmission from the light guide plate 602 through the shield panel 618. In one example the shield panel 618 is made from polycarbonate to match the light guide plate 602.

As the name implies, the shield panel 618 serves to protect the light guide plate from direct impacts from the iceward side of the dasher board 600—e.g. from players, pucks, etc. Suitably one or more washers 620 may be provided in between the shield panel 618 and light guide plate 602 such that an air gap exists between the two components. As before the air gap minimises contact between the panels (i.e. between the light guide plate 602 and shield panel 618) so as to minimise the potential for light coupling which could lead to (NIR) hotspots. Further, the air gap may conveniently act as a cushion to minimise impacts on the light guide plate 602 and improve longevity of the replacement optical structure. Preferably the shield plate 618 has substantially the same profile as the light guide plate 602 for ease of installation on the dasher board 600, although it will be appreciated that the shield panel 618 may be provided larger than the light guide plate 602 while still fulfilling its primary purpose.

Much like a typical front panel of a dasher board, the shield panel 618 may serve as a surface onto which original content 11 is applied, provided such content 11 does not adversely affect NIR transmission, or as is often the case may simply be left blank.

Although the above has been framed in the context of an ice hockey dasher board, it will also be appreciated that other static display surfaces may be adapted in a similar manner for use in a video content replacement system. In one example, a backboard of a basketball net may be adapted so that the backboard may be overlaid with digital content during a broadcast. In another example, a floor surface may be adapted so that a floor area in a broadcast may be replaced with digital content.

Courtside Electronic Billboard

Figure 7:
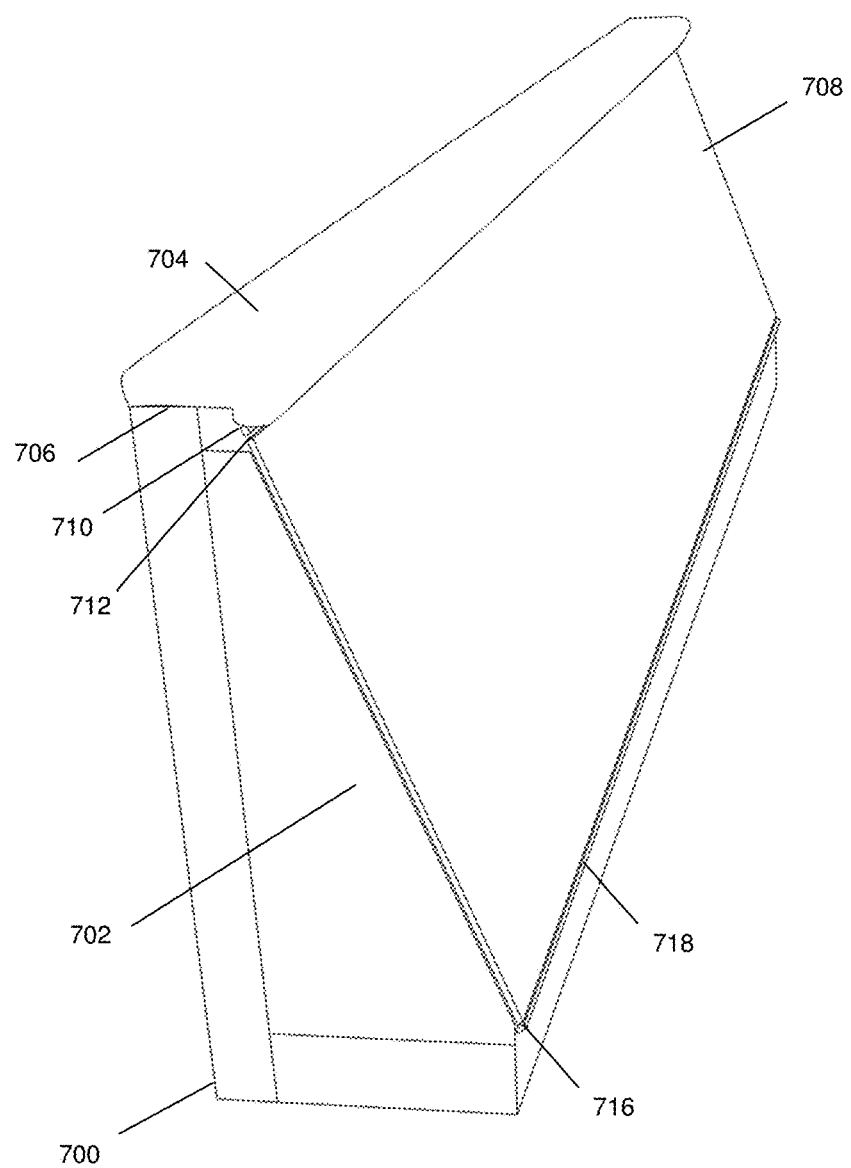
FIG. 7 shows an electronic billboard for use in a content replacement system.

FIG. 7 shows a second example embodiment of the invention whereby the above teachings are applied to a courtside electronic billboard 700, as might be found adjacent to e.g. a basketball court.

As will be familiar to those in the art, courtside electronic billboards 700 typically include a frame (usually portable) to which is mounted an electronic display 702 which displays content 11 (e.g. advertising content). The display 702 is usually an LCD or LED display which is arranged at an angle relative to the ground such that it is more readily viewable from above (e.g. by people and cameras in a stand). The electronic billboard 700 usually includes a cover cushion 704 along its top edge 706, particularly when the billboard is intended for use in areas close to players and onlookers (again, as might be found at a basketball court).

For use with a content replacement system 400, the courtside electronic billboard 700 is modified to include a light guide plate 708 mounted in front of the electronic display 702. The light guide plate 708 scatters NIR light transmitted to a first edge 712 of the light guide plate 708 by an NIR emitter 710. Thus, the content replacement system 400 may appropriately determine the target display area based on an NIR image of the electronic billboard 700 captured by an NIR detector 60. Suitably the light guide plate 708 may have a major surface which substantially matches a display area of the electronic display 702.

The light guide plate 708 serves a dual purpose of shielding the electronic display 702 from direct impact, thereby protecting the display 702. Suitably the light guide plate may be formed from a material which is both resilient to impact and optically transparent to visible light (so that the display may still be viewed). Preferably the light guide plate 708 is formed from acrylic. Although acrylic is not as robust as polycarbonate, as discussed above, court-based sports (e.g. basketball) are typically less impactful than e.g. ice hockey and so the increased durability and resilience that is gained from a polycarbonate light guide plate is not as necessary. Furthermore, polycarbonate is not as optically transparent as acrylic—i.e. it's not as clear—and would therefore reduce visibility of the electronic billboard, which will be appreciated is not desirable.

As with the dasher board 600, the NIR emitter 710 of the electronic billboard 700 may suitably take the form of a strip of NIR light emitting diodes 'LEDs'. The first edge 712 is preferably a top edge of the light guide plate 708. Preferably the electronic billboard 700 is arranged to house the NIR emitter 710 in a cushion portion 714 of the electronic billboard 700. A power source for the NIR emitter 710 may suitably be housed within the frame of the electronic billboard 700.

In order to improve NIR scattering from the light guide plate 708, the electronic billboard 700 may suitably comprise a second NIR emitter 716 to provide NIR light to a second edge 718 of the light guide plate 708. Where the first NIR emitter 710 is arranged to provide NIR light to a top edge 712 of the light guide plate 708, then the second NIR emitter 716 is preferably arranged to provide NIR light to a bottom edge. That is, generally, the second NIR emitter 716 is arranged to provide light to an opposite edge of the light guide plate 708 to the first NIR emitter 710.

Figure 8:
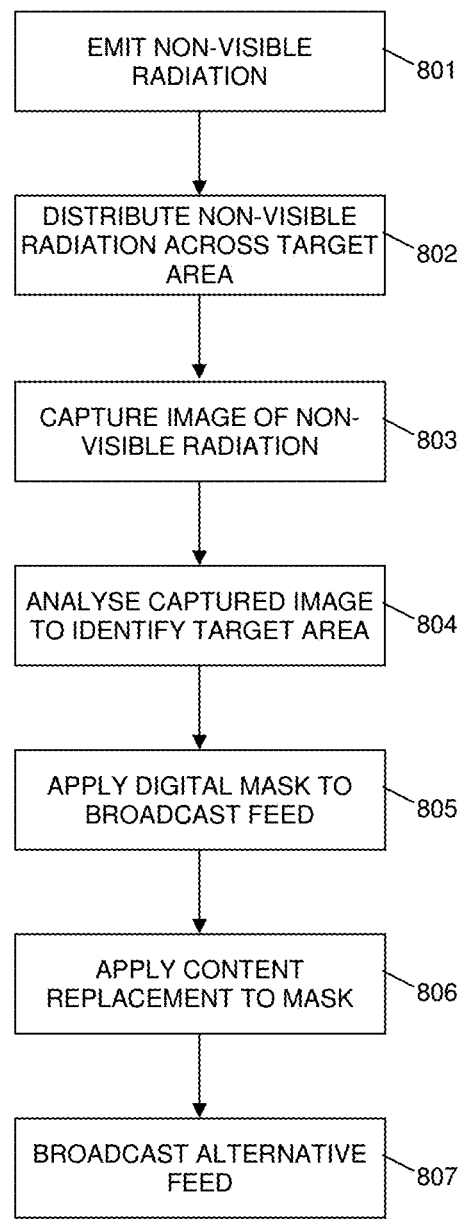
FIG. 8 is a schematic flow diagram of an example method of applying content replacement based on a received NIR image of a billboard.

Unlike the light guide plate 602 used with the dasher board 600, it is not appropriate to include NIR boosting zones on the light guide plate 708 of the electronic billboard 700. It will be appreciated that to do so would impair viewing of the original content 11 shown on the display 702. Method FIG. 8 is a schematic flow diagram of an example method for using an example billboard 10, 600, 700 in a content replacement system 400. The method may be performed for example by a programmed computer device or by dedicated hardware.

The method may include the step 801 whereby non-visible radiation is emitted toward a light guide plate of a billboard, preferably toward a thin edge of said light guide plate. At step 802 the non-visible radiation is distributed over the light guide plate such that the light guide plate emits non-visible radiation with substantially uniform intensity from a major surface of the light guide plate (i.e. a surface oriented orthogonally to the edge which receives the non-visible radiation). Suitably the uniformly transmitted non-visible radiation may be substantially aligned with a display area to be replaced in a content replacement system. That is, the non-visible radiation is distributed over the target area which is to be eventually replaced with alternative content by the content replacement system 400. Step 803 comprises capturing, by an NIR detector 60, at least one image of the billboard. As described above, the NIR detector 60 may be associated with a camera 20 observing a sports event. Step 804 comprises analysing the captured image to determine if any part of the image includes any areas of a sufficiently high non-visible radiation signal. The analysis may be performed on a pixel wise basis, and a sufficiently high signal may be associated with any pixel in which the captured pixel value is greater than a pre-set background value. Pixel values of the captured image may also be normalised, such that a value close to zero represents background while a value close to 1 indicates a target display area. Step 805 comprises applying a digital mask to an area of the broadcast feed which correlates to the identified area of the captured non-visible radiation image. That is, based on the captured image of the billboard 10 which includes the non-visible radiation signal, a digital mask may be applied to the display area of the billboard as viewed on the broadcast feed 32. At Step 806 alternative content 42 may be applied to the area of the broadcast feed with the digital mask. As described previously the alternative content may be retrieved from a storage medium 49. Step 807 comprises producing and transmitting the alternative feed 41 with the alternative content 42.

It will be appreciated that the example method is suitable for use in a dynamic image content manipulation process. In particular, the content of an image is modified in some way by introducing alternate or additional image content. A dynamic method is preferred in that the image content may change significantly from frame to frame, such as for a live television broadcast which selects amongst multiple cameras with varying image contents.

The devices and system described herein are well adapted to be integrated with existing commercial equipment, allowing for any billboard to be modified with a suitable optical structure. As a result, the system is more flexible to operate in conjunction with pre-existing video content replacement setups, thus minimising commercial and logistic constraints toward integrating the system with the existing equipment.

As a further advantage, the described devices are tailored to environments whereby physical abuse of the billboard may be expected. Thus the video content system described herein may be employed in environments that would have previously relied on entirely software solutions to apply the content replacement; now these environments can make use of the improved reliability to content replacement that may be derived from the NIR targeting method of the present disclosure, thereby providing a richer and more appealing visual result in the modified program signals. As a result, viewers are more likely to find the added alternate content visually appealing and integrated with the original signal. Thus, a better photo-realistic result can be achieved.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" may mean including the component(s) specified but is not intended to exclude the presence of other components.

Although a few example embodiments have been shown and described, it will be appreciated by those skilled in the art that various changes and modifications might be made without departing from the scope of the invention, as defined in the appended claims. For example, there may be provided a computer device which is configured to perform any of the functions or methods mentioned herein, or there may be provided a tangible non-transient computer readable medium having recorded thereon instructions which when executed cause a computer to perform any of the functions or methods defined herein.

What is claimed is:

1. A billboard formed as a dasher board and which is adapted for use in a video content replacement system, comprising:
   at least one non-visible radiation source arranged to emit non-visible radiation toward a light guide plate,
   wherein the light guide plate is arranged to receive the non-visible radiation on at least one edge of the light guide plate, distribute the non-visible radiation over the light guide plate, and radiate the non-visible radiation away from the dasher board,
   wherein an area of the light guide plate over which non-visible light is distributed from is correlated to an area of the dasher board which is to be replaced in the video content replacement system, and
   wherein the dasher board is configured to house the infra-red radiation source in a handrail portion of the dasher board.

2. The billboard of claim 1, wherein the at least one non-visible radiation source includes a near infra-red emitter and the non-visible radiation is near infra-red radiation.

3. The billboard of claim 1, wherein the light guide plate is formed from a polycarbonate which is capable of withstanding impact from an ice hockey puck.

4. The billboard of claim 1, wherein the light guide plate comprises a plurality of infra-red scattering dots to improve an efficiency of non-visible radiation distribution.

5. The billboard of claim 4, wherein the plurality of infra-red scattering dots have a size which increases with increasing distance from the at least one edge of the light guide plate which receives the non-visible radiation.

6. The billboard of claim 1, wherein the dasher board houses a power source for the infra-red radiation source.

7. The billboard of claim 1, further comprising a reflector plate arranged in between the light guide plate and a frame of the dasher board.

8. The billboard of claim 7, wherein the reflector plate and light guide plate are arranged with an airgap therebetween.

9. The billboard of claim 1, further comprising a protective shield panel covering the light guide plate.

10. The billboard of claim 9, wherein the protective shield panel and the light guide plate are arranged with an airgap therebetween.

11. A billboard adapted for use in a video content replacement system, the billboard comprising:
    an electronic display which displays visible content, and
    at least one non-visible radiation source arranged to emit non-visible radiation toward a light guide plate mounted in front of the electronic display,
    wherein the light guide plate is arranged to receive the non-visible radiation on at least one edge of the light guide plate, distribute the non-visible radiation over the light guide plate, and transmit the non-visible radiation away from the billboard,
    wherein an area of the light guide plate over which non-visible light is distributed is coincident with a display area of the electronic display which displays visible content and is to be replaced with an alternative content in the video content replacement system, and
    wherein the billboard comprises a cover cushion, and the electronic billboard is arranged to house the at least one non-visible radiation source within the cover cushion.

12. The billboard of claim 11, wherein the at least one non-visible radiation source includes a near infra-red emitter and the non-visible radiation is near infra-red radiation.

13. The billboard of claim 11, wherein the at least one non-visible radiation source and at least one edge of the light guide plate includes:
    a first edge of the light guide plate arranged to receive non-visible radiation from a first non-visible radiation source, and
    a second edge of the light guide plate arranged to receive non-visible radiation from a second non-visible radiation source.

14. The billboard of claim 13, wherein first non-visible radiation source is arranged on an opposite side of the light guide plate to the second non-visible radiation source.

\* \* \* \* \*